C. H. HORTON.
BRICK MACHINE.
APPLICATION FILED MAR. 19, 1915.
1,184,648.
Patented May 23, 1916.
9 SHEETS—SHEET 6.
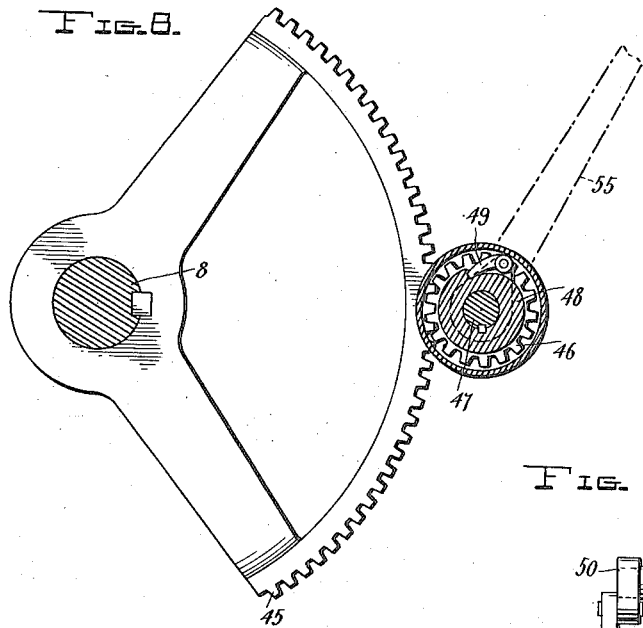
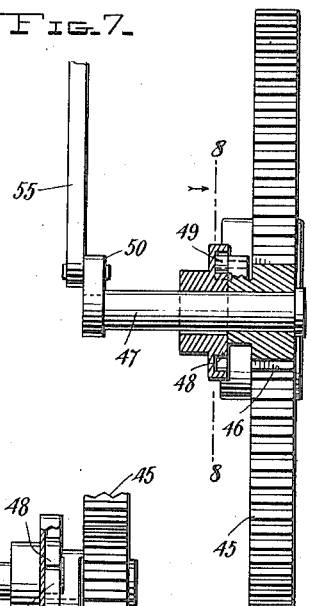
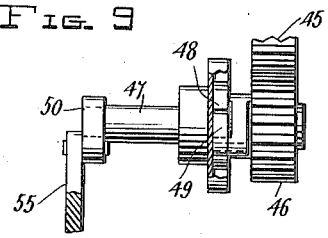
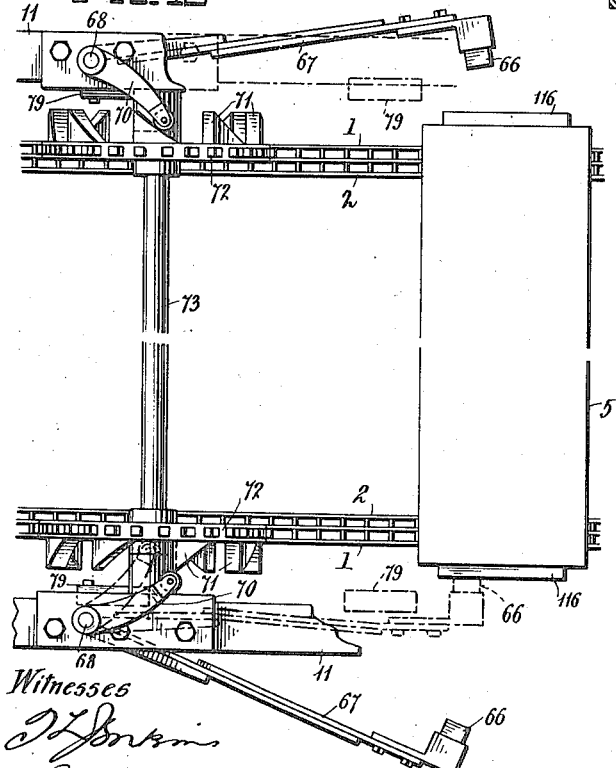
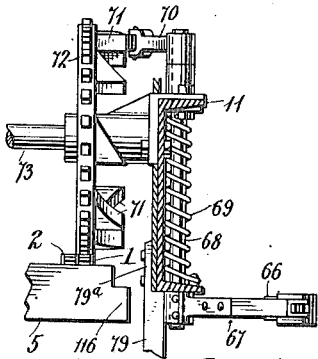
Inventor
Charles H. Horton,
by
James L. Norris,
Attorney.
Witnesses

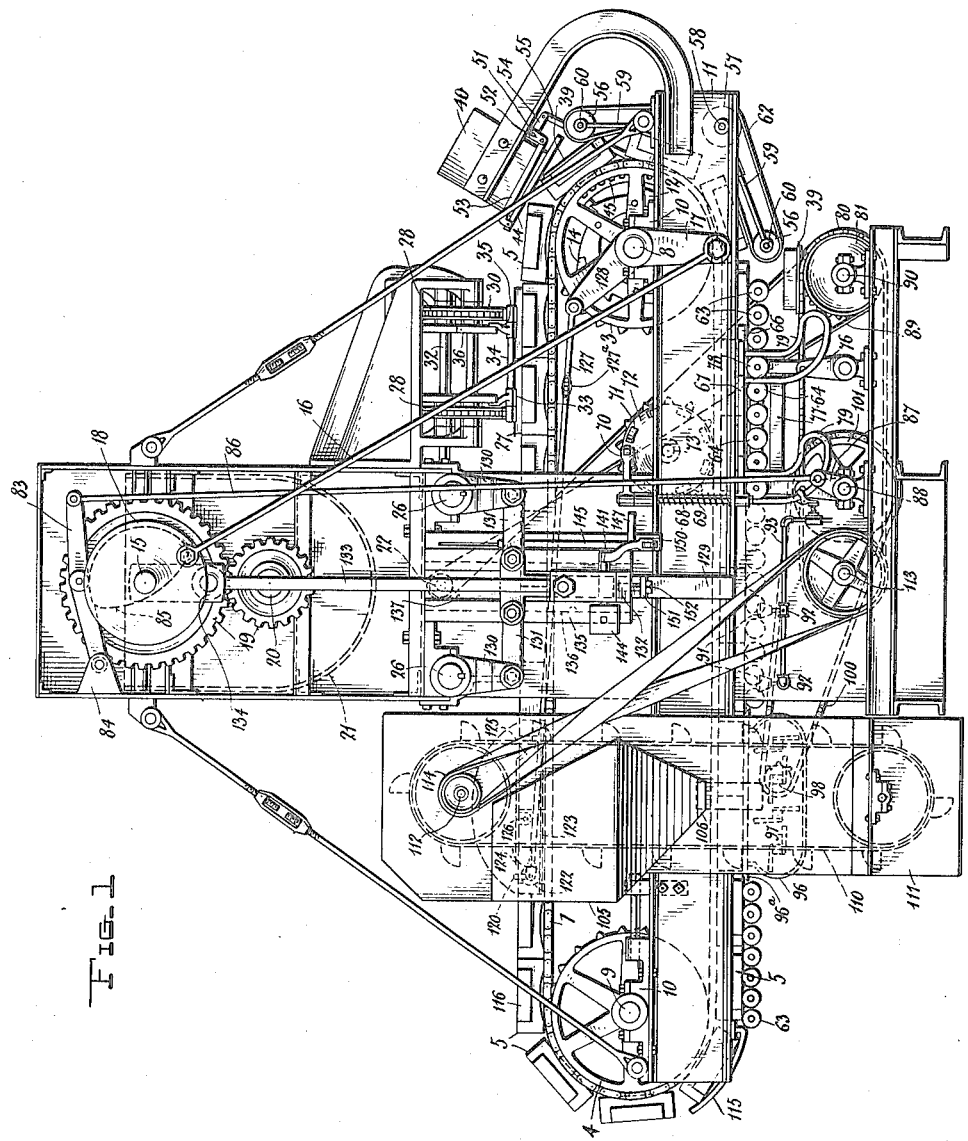

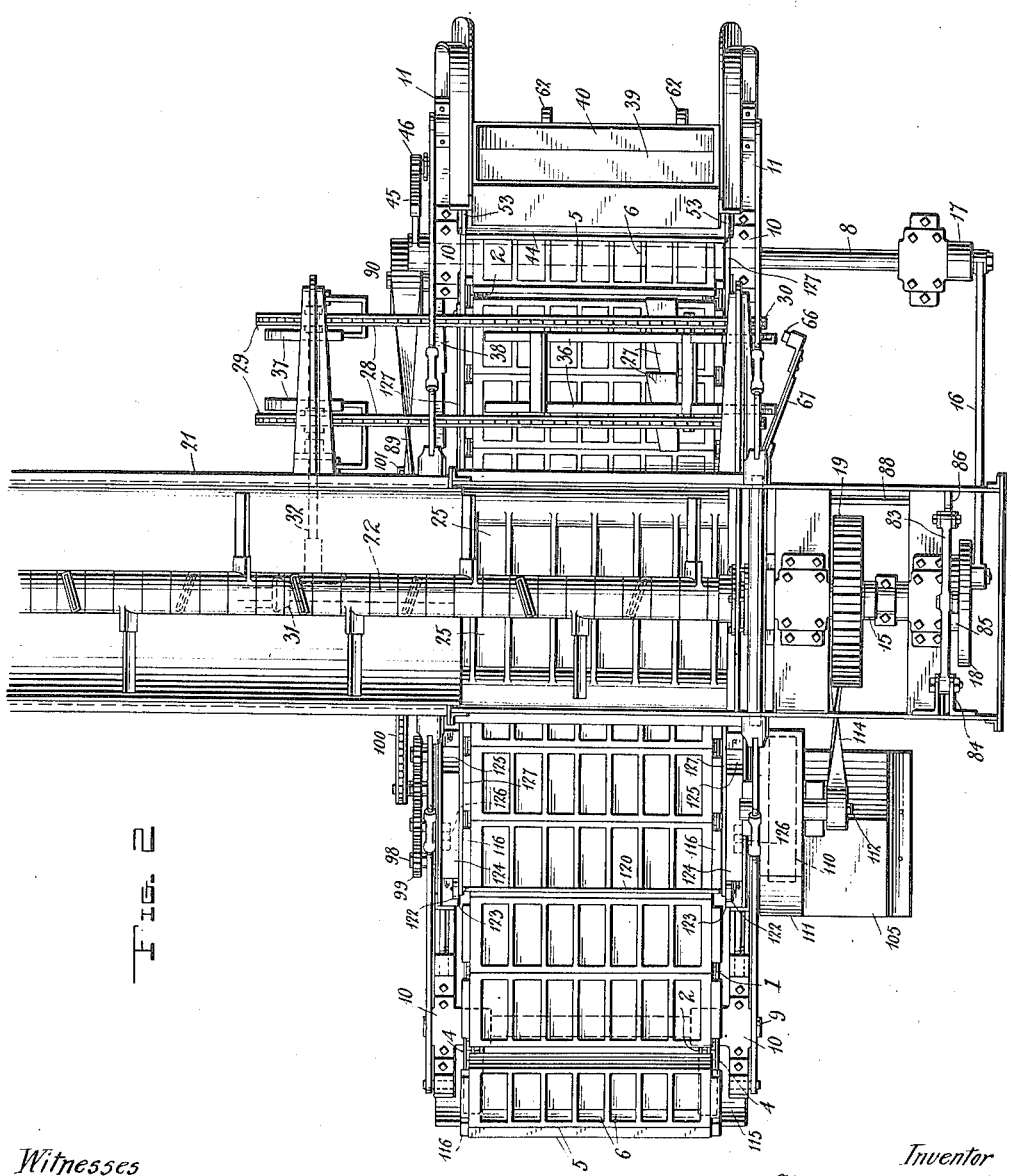

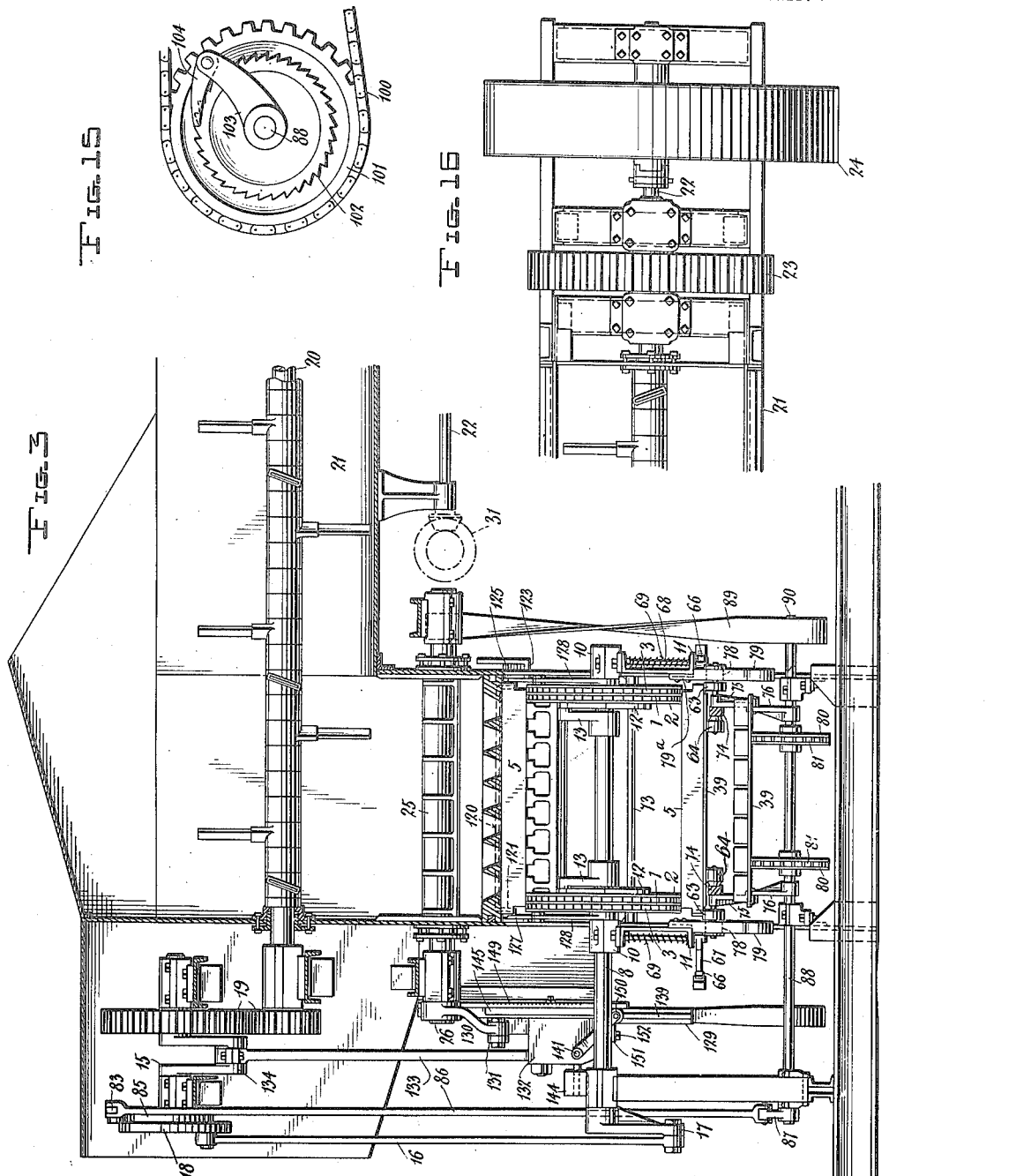

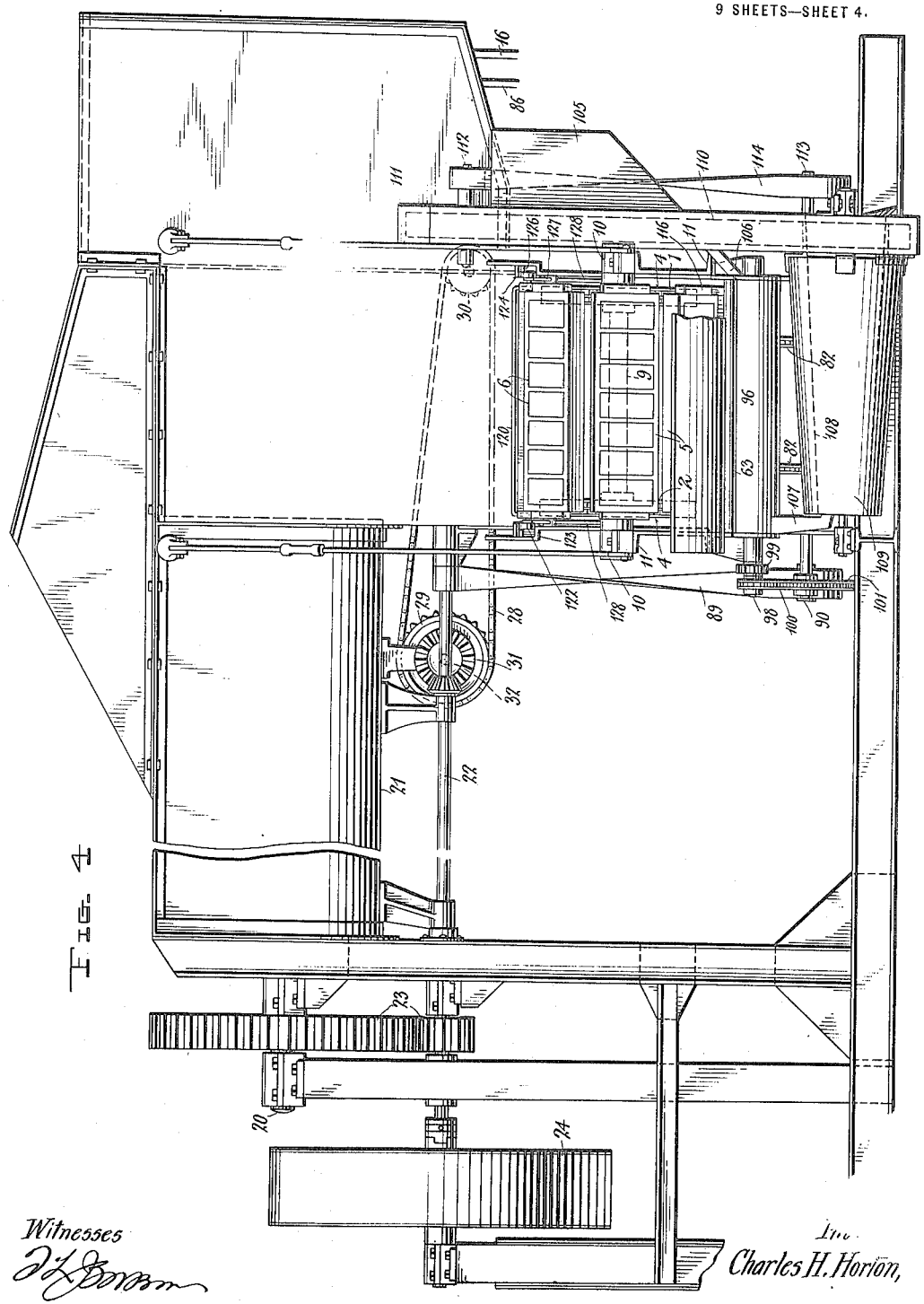

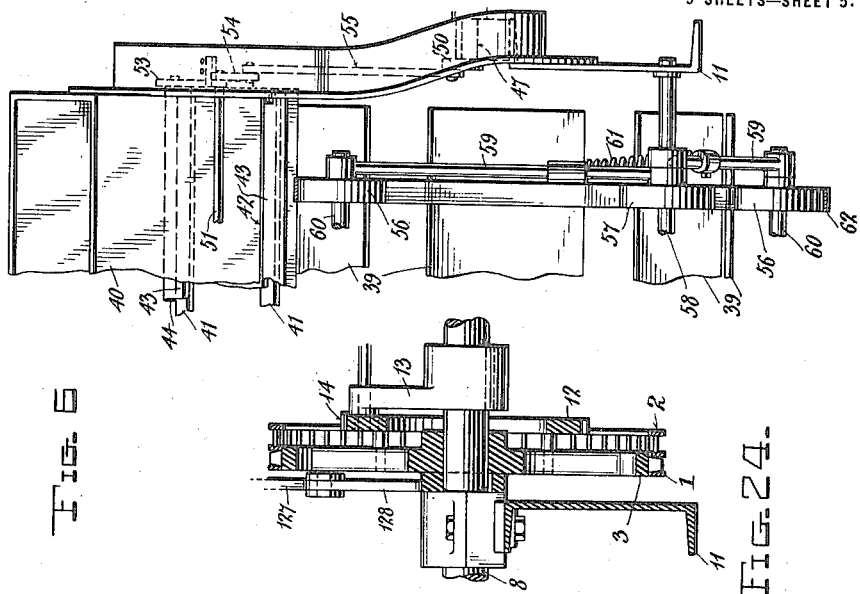

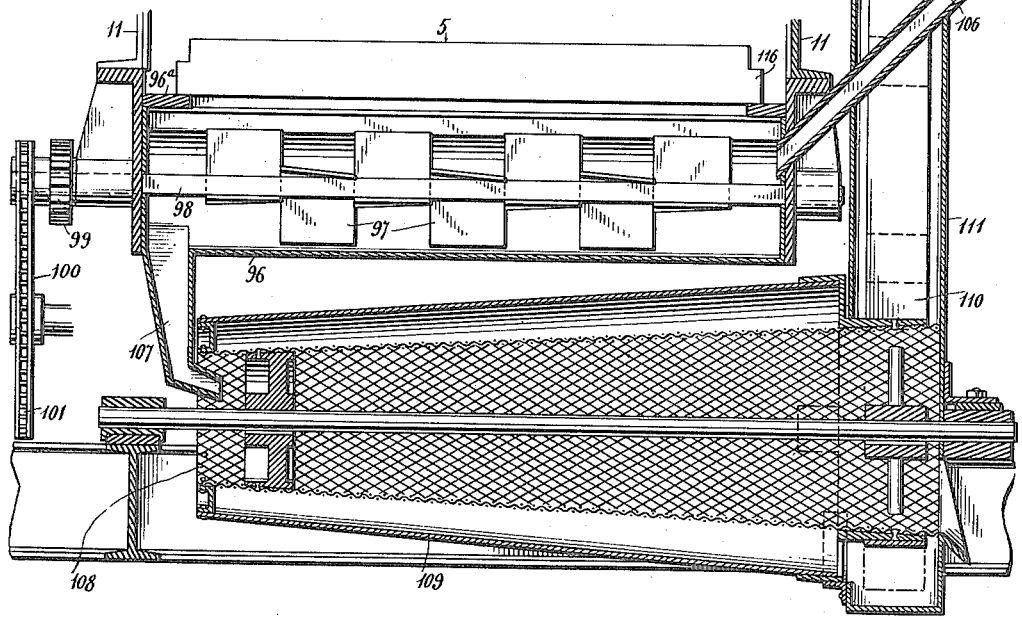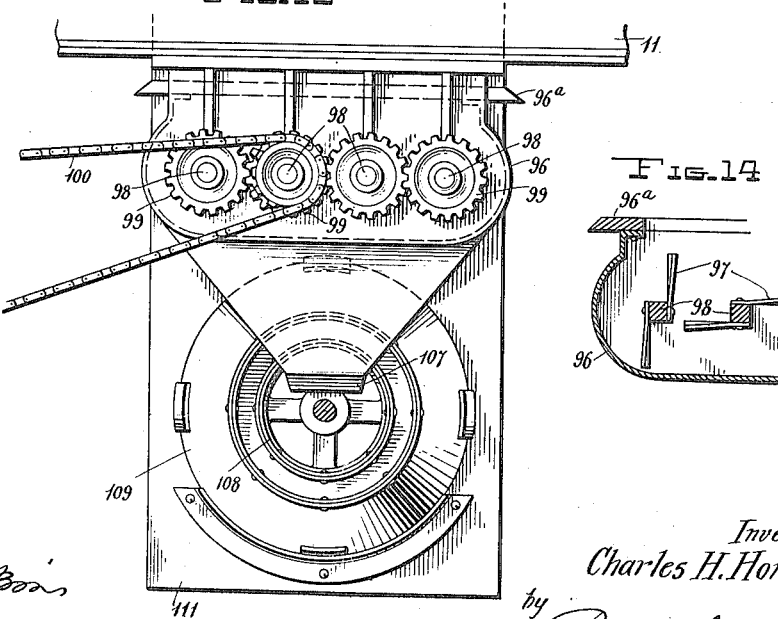

C. H. HORTON.
BRICK MACHINE.
APPLICATION FILED MAR. 19, 1915.
1,184,648.
Patented May 23, 1916.
9 SHEETS—SHEET 8.
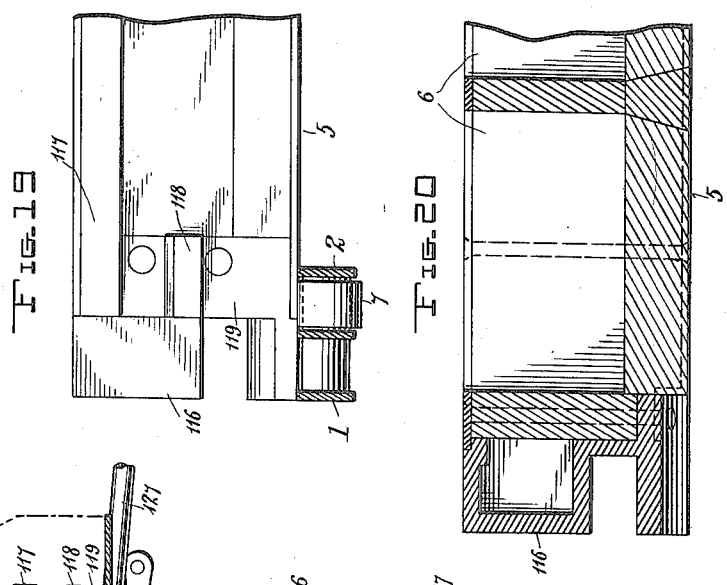
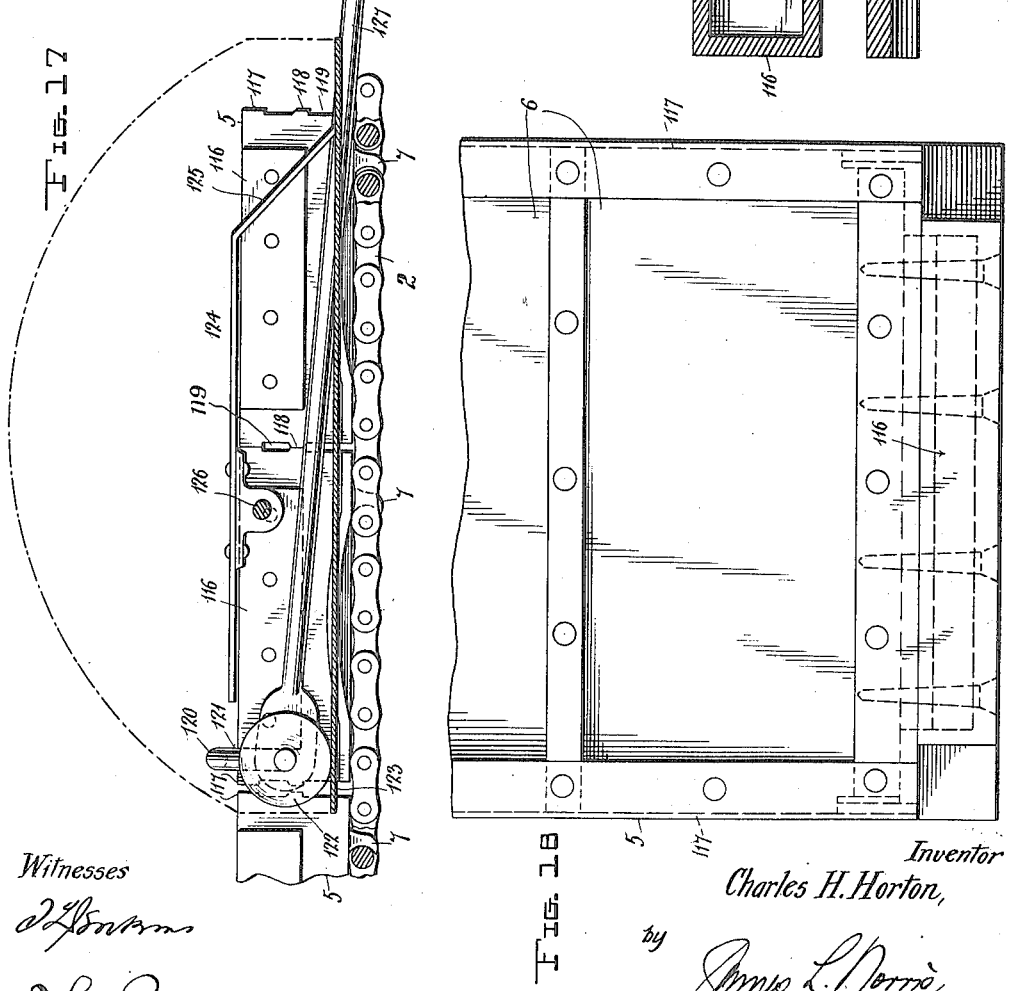
Witnesses
Inventor
Charles H. Horton,
by
Attorney.

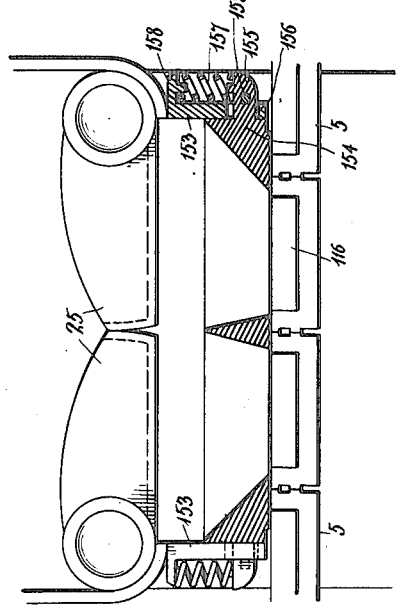
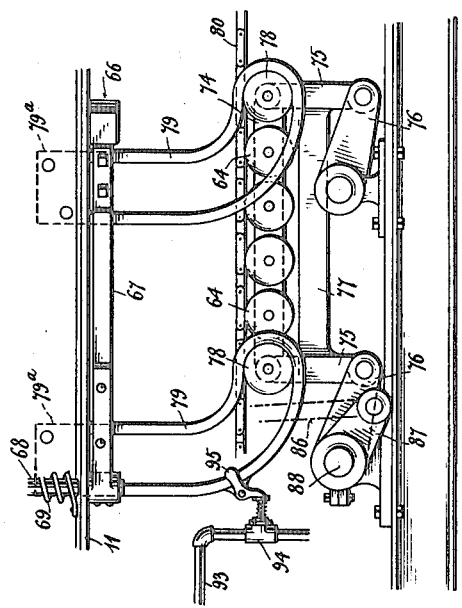

UNITED STATES PATENT OFFICE.

CHARLES H. HORTON, OF PAINESVILLE, OHIO.

BRICK-MACHINE.

1,184,648.  Specification of Letters Patent.  Patented May 23, 1916.

Application filed March 19, 1915. Serial No. 15,547.

*To all whom it may concern:*

Be it known that I, CHARLES H. HORTON, a citizen of the United States, residing at Painesville, in the county of Lake and State of Ohio, have invented new and useful Improvements in Brick-Machines, of which the following is a specification.

This invention relates to improvements in brick machines, proposing a machine for the manufacture of molded bricks from tempered clay which automatically finishes and delivers the molded product and automatically prepares the molds for the reception of the clay charges.

The invention proposes certain improvements in a machine of that type wherein the molds are moved by an endless carrier in relation to the various instrumentalities of the machine.

The improvements are directed more particularly to the construction of the carrier, the molds, the pallet feeding mechanism, the mechanism for holding the pallets in contact with the molds as they pass from the upper to the lower run of the carrier, the mold jarring mechanism, the mold discharging mechanism, the mechanism for holding the molds in contact with one another as they pass under the mud press, and that part of the mud press casing which is directly coöperative with the molds; and to the relation between the molds and the mold carrier and between the mold washer and the mold sander. These improvements and their objects and advantages will appear as the description proceeds.

An embodiment of the invention is illustrated in the accompanying drawings, wherein:—

Figure 1 is a side elevation of a brick machine in which the features of the invention are incorporated; Fig. 2 is a top plan view thereof; Fig. 3 is an end elevation thereof with certain parts of the mud press shown in section and with the pallet feeding mechanism omitted for the sake of convenience; Fig. 4 is an elevation of the machine looking at the end opposite to that shown in Fig. 3; Fig. 5 is a detail view, partly in side elevation and partly in section, showing the construction of the pallet feeding mechanism and certain driving elements of the mold carrier; Fig. 6 is a detail end elevation of the pallet feeding mechanism shown in Fig. 5; Fig. 7 is a detail view, partly in cross-section, showing certain elements for operating the pallet feeding mechanism; Fig. 8 is a detail sectional view on the line 8—8 of Fig. 7; Fig. 9 is a detail plan view, partly in section, of features shown in Figs. 7 and 8; Fig. 10 is a detail plan view of the mechanism for loosening the bricks from the molds prior to the discharge of the bricks; Fig. 11 is a detail sectional view showing certain parts of the mechanism shown in Fig. 10; Fig. 12 is a detail sectional view showing the construction of the mold sander; this view is in a plane transverse to the plane of the machine as a whole but longitudinal of the mold sander *per se;* Fig. 13 is a detail end elevation thereof; Fig. 14 is a detail sectional view of certain elements of the mold sander in a plane at right angles to the plane of Fig. 12; Fig. 15, (Sheet 3), is a detail view showing certain driving connections which participate in the operation of the mold sander; Fig. 16, (Sheet 3), is a detail plan view showing an end portion of the pug mill and the main drive shaft; Fig. 17 is a detail view, partly in section, showing certain features of the mechanism for holding the molds in contact with one another during their travel is relation to the mud press; this figure also shows two of the molds in end elevation; Fig. 18 is a detail partial plan view of a mold; Fig. 19 is a detail partial side elevation of a mold; Fig. 20 is a detail partial longitudinal sectional view of a mold; Fig. 21 is a detail view showing more clearly the operation of the mechanism for discharging the molded bricks; Fig. 22 is a' detail view showing the improved end wall construction of the mud press; Fig. 23 is a detail elevation of the same; Fig. 24 (Sheet 5) is a detail sectional view showing certain driving elements of the mold carrier.

Similar characters of reference designate corresponding parts throughout the several views.

*The mold and the mold carrier.*—The molds in which the bricks are formed are moved by a suitable mold carrier which, in the embodiment disclosed, is of endless form and includes a pair of chains 1 and 2 arranged at each side of the machine. The chains of each pair are suitably connected together to form, in effect, a single chain of double links and the chains 1 work over sprocket wheels 3 and 4 located, respectively, at the front and rear ends of the machine while the chains 2 are utilized for the carriage of the molds and their links are engaged by projections on the molds, as will be more fully described hereinafter.

The molds, shown more in detail in Figs. 17 to 20, and designated generally by the numeral 5, consist, in each instance, of an elongated mold box arranged with its greatest length transverse to the machine and divided by partitions extending longitudinally of the machine into mold chambers 6 arranged continuously from end to end of the mold box. Each mold has near its front side and at each end thereof a depending hook-like lug 7 which engages loosely between certain links of the chain 2, as is clearly shown in Fig. 17.

The sprockets 3 are loosely mounted on a transverse shaft 8 and the sprockets 4 are mounted on a transverse shaft 9, the shafts 8 and 9 being journaled in suitable bearings 10 mounted upon the upper sides of the side bars 11 of the machine frame.

The mold carrier comprising the chains 1 and 2 is operated intermittently. The shaft upon which the sprocket wheels 3, as stated, are loosely mounted, is given an oscillatory movement and produces a rotation of the sprockets 3 on its movement in one direction but is without effect on said sprockets in its movement in an opposite direction. The connections for driving the sprockets 3 from the shaft 8 preferably comprise ratchet wheels 12 secured to the sprockets 3 and arms 13 secured on the shaft 8 (Figs. 3, 8, and 24) and provided with pawls 14 for engagement with said ratchet wheels. When the shaft 8 has clockwise rotation, a similar rotation of the sprocket wheels 3 is produced through the coaction of the elements 12, 13 and 14, but when the shaft 8 has counter-clockwise rotation, the sprockets 3 are without movement, as is obvious. The shaft 8 is driven from a counter shaft 15 through a link 16 connected to an arm 17 arranged at one end of the shaft 8 and to a crank wheel 18 mounted on the shaft 15. The shaft 15, in turn, is driven by suitable reducing gearing 19 from the shaft 20 of the pug mill 21 arranged transversely of the machine.

The machine as an entirety is operated by a main shaft 22 (Figs. 4 and 16) which is preferably arranged under the pug mill, extending transversely of the machine and is connected by suitable reducing gearing 23 to the pug mill shaft 20, the shaft 22 being provided with a suitable friction clutch driving pulley 24 which is geared to a motor or counter shaft (not shown).

*The pug mill and the mud press.*—The pug mill 21 may be of any suitable construction and forms, *per se*, no part of the invention. The same is true of the mud press arranged under the pug mill. The mud press is, however, preferably of the construction shown in my prior Patent No. 497,322 of May 16, 1893, and includes the oppositely movable co-acting press plates 25 (Figs. 2, 3 and 22) and the parallel rock shafts 26 (Figs. 1 and 3) upon which said press plates are mounted.

*The instrumentalities which operate in connection with the molding and discharge of the bricks.*—The instrumentalities which operate in connection with the molding and discharge of the bricks are, in the order of their succession, the mud press, previously identified, the mechanism for removing surplus clay from the molds, the mechanism for feeding pallets to the molds, the mechanism for positioning the pallets upon the molds, the mechanism for loosening the bricks from the walls of the mold chambers 6 and the mechanism for discharging the bricks from the machine by transferring them upon their pallets to a suitable conveyer. These mechanisms will be described *seriatim*. At this point, it may be noted that the above and other mechanisms to be hereinafter described are, in the embodiment disclosed, adapted to work in relation to a pair of molds.

*The mechanism for removing surplus clay from the molds.*—This mechanism (Figs. 1, 2 and 4) forms the subject of a divisional application Serial No. 68404 and will, therefore, be described only sufficiently to distinguish its elements from the elements of other mechanisms of the machine. The mechanism includes scrapers 27 movable cross-wise of the train of molds by endless chains 28 trained over sprocket wheels 29 and 30 and driven from the main shaft 22 through bevel gearing connecting said main shaft and the shaft 32 on which the sprocket wheels 29 are mounted. The scrapers 27 project from collars 23 which are mounted on a bar 34 extending between and supported by the chains 28. The positions of the scrapers 24 with reference to the bar 34 as a pivotal axis are controlled by arms 35 projecting from said bar and co-acting with cam rails 36 and 37. After the scrapers 27 pass beyond the molds, they strike against fixed transverse blades 28 which remove from the scrapers the clay which the scrapers have previously removed from the tops of the molds.

*The mechanism for feeding pallets to the molds.*—The pallet feeding mechanism and its appurtenances are shown more in detail in Figs. 5 to 9. The pallets, which are shown at 39, are stacked in a magazine 40 located adjacent the sprockets 3 and preferably at such a point that the pallets are delivered to the molds at the inception of their movement through the curved path prescribed by said sprockets. The magazine 40 is open at its lowermost end and the lowermost pallet of the stack rests on ledges 41. Slots 42 intervene between the lower ends of the magazine 40 and the ledges 41, which latter are utilized to support lugs 43 arranged at each side of the magazine and having recesses 44 in which the ledges 41 fit. The portions of said lugs above said ledges work through the slots 42 which are of greater depth than the thickness of the pallets. The lugs 43 are carried by a suitable frame 44 to which reciprocatory movement is imparted. When the frame 44 is moved in one direction, for instance, toward the right, (Fig. 5 of the drawing being considered), the lugs 43 at the left side of the frame 44 will push the lowermost pallet from the adjacent ledge 41 and when the frame 44 is moved in the opposite direction, i. e. toward the left, the lugs 43 at the right side of said frame will push the lowermost pallet from the adjacent ledge 41. The lowermost pallet, being thus freed from the ledges 41, will fall by gravity to a position against the top of the mold which happens to be adjacent the magazine 40.

The feeding of the pallets in the manner just described takes place during the periods of movement of the molds and the pallet feeding mechanism is, therefore, conveniently operated from the shaft 8. The connections for operating the pallet feeding mechanism, and which are preferably of the construction disclosed, comprise a pinion segment 45 mounted on the shaft 8, a pinion 46 gearing with the segment 45, a shaft 47 upon which the pinion 46 is loosely mounted, a ratchet wheel 48 fast on the shaft 47, a pawl 49 carried by the pinion 46 and engaging the tooth of the ratchet wheel 48, a crank arm 50 provided on the shaft 47, a rock shaft 51 mounted adjacent the magazine 40 and provided with arms 52, links 53 connecting the arms 52 and one of the bars of the frame 44, preferably the bar at the left side of said frame, (Fig. 5 of the drawing being considered), an arm 54 projecting from the shaft 51 at an angle to the arms 52 and a link 55 connecting the arm 54 to the crank arm 50. By virtue of the connections just described, when the shaft 8 is turned in a clockwise direction, the shaft 47 is rotated and the frame 44 is reciprocated, as previously described. When the shaft 8 is rotated in a counter-clockwise direction, the pawl 49 will ride backward over the ratchet 48 and no rotation of the shaft 47, (and consequently, no reciprocation of the frame 44), will be produced. As previously stated, the instrumentalities of the machine are adapted in each operation thereof to work with reference to a pair of molds, and with this fact in mind, the relation between the segment 45 and the pinion 46 is such that the shaft 47 is given two complete revolutions during each clockwise movement of the shaft 8 whereby two pallets are discharged in succession from the magazine 40.

Appurtenant to the pallet feeding mechanism is the device which positions the pallets discharged from the magazine in relation to the molds and which holds the pallets against the molds during the travel of the molds through the arc prescribed by the sprockets 3. This device preferably comprises a pair of flexible belts or chains working over end pulleys or sprockets 56 and intermediate sprockets or pulleys 57. The pulleys or sprockets 57 are mounted on a fixed rod 58 which forms the pivot of angularly disposed radius links 59 which at their outer ends carry the rods 60 which form the axes of the pulleys or sprockets 56. The radius links 59 are preferably connected by a spiral retractile spring 61 which tends to draw said links toward one another, and consequently, to cause the chains or belts 62 which work over the pulleys or sprockets 56 and 57 to exert pressure against the pallets and to thereby hold the pallets in proper relation to the molds during the travel of the latter about the arc prescribed by the sprockets 3. The chains or belts 62 are so arranged relatively to the sprockets 3 that when a pallet is discharged from the magazine 40, it will in its descending movement be caught between the adjacent mold and the belts or chains 62 at a time when it is in operative position relative to said mold and, by said belts or chains, will be held against further descending movement relative to said mold. Thus, the belts or chains 62 aid in initially positioning the pallets upon the molds and maintain the pallets in operative positions relative to the molds throughout the remainder of the movement of the molds about the sprockets 3. The sprockets 56 and 57 for the belts or chains 62 are idlers and it will be apparent from this that said belts or chains are moved by the molds as the latter travel through the arc prescribed by the sprockets 3 and have no motion relative to the said molds.

*The mechanism for loosening the bricks from the walls of the mold chambers.*— The molds after leaving the belts or chains 62 are supported by rollers 63, in turn supported in any suitable manner from the side bars 11 of the machine frame and arranged throughout the length of said side bars excepting the portions thereof which project through the mold sander to be hereafter described. The rollers 63 are arranged to engage the end portions of the molds and are located beyond the ends of the pallets, which latter shortly after the molds leave the belts or chains 62, pass over rollers 64. Certain of the rollers 63 are omitted from Fig. 1 in order to expose to view the rollers 64 which are elements of a brick discharging mechanism to be hereinafter described and are normally horizontally co-planar with the rollers 63. The rollers 64 are, however moved at periods, in the operation of the machine, into a plane below the plane of the rollers 63.

The mechanism for loosening the bricks from the walls of the mold chambers (Figs. 1, 2, 3, 10 and 11) operates upon each mold during its travel over the rollers 63 and includes a pair of hammers 66 arranged under the frame bars 11 and preferably carried by relatively long levers or arms 67 composed of springy or resilient metal. The levers or arms 67 are operated whereby their hammers 66 deliver one or more sharp and strong blows upon the end of each mold 5 to loosen the bricks from the walls of the mold chambers and, hence, to prepare the bricks for their subsequent discharge from the machine. The hammers 66 work in alternation at the opposite sides of the machine.

A preferred mechanism for operating the hammers 66 includes vertical rock shafts 68 journaled in bearings carried by the frame bars 11 and to the projecting lower ends of which the levers 67 are secured. The shafts 68 are rotated to effect operative movements of the levers 67 by suitable torsion springs 69 surrounding the shafts 68 between the bearings thereof and having their ends secured, respectively, to said shafts and to the frame bars 11. For the purpose of rotating the shafts 68 against the tension of the springs 69, said shafts are provided at their projecting upper ends with arms 70 equipped with friction rollers and arranged in the path of an annular series of cam projections 71 outstanding from the outer sides of wheels 72. The wheels 72 are mounted on a transverse shaft 73 having its ends journaled in suitable bearings secured to the frame bars 11. One, (or it might be both), of the wheels 72 is provided with sprocket teeth for engagement with the adjacent chain 1. It will be obvious that the said chain 1 will drive the wheels 72 and as said wheels are rotated the cam projections 71 thereof will successively engage the arms 70 and will turn the rock shaft 68 against the tension of the springs 69, thereby storing power in said springs. When the arms 70 are disengaged by the cam projections 71, the springs 69 are operative to rock the shafts 68 and produce operation of the hammers 66. The number of blows delivered by the hammers upon each mold may be regulated as desired by a suitable selection of the diameter of the wheels 72 and of the number of cam projections upon each wheel. The movement of the shaft 68 by the springs 69 not only produces operation of the hammers 66 but also produces a movement of the arms 70 against the plain faces of the wheels 72 and into the path of the cam projections on said wheels.

*The mechanism for discharging the bricks.*—The molds in the course of their movement along the lower run of the mold carrier travel over the rollers 64 which, as above stated, are elements of the mechanism for discharging the bricks (Figs. 1, 3 and 21) and are arranged to engage the pallets. The pintles of the rollers 64 are journaled in a suitable frame 74 which is supported and raised and lowered by the operation of a toggle system composed of upper and lower links 75 and 76 arranged in front and rear pairs. The mutual pivots of the links at each side of the machine are preferably connected by a bar 77 by which the movements of the front pairs of links are effected from the movements of the rear pairs of links. The frame 74 also carries at its ends and at each side thereof rollers 78 which operate in guide members 79 depending from the side bars 11 and having extensions 79ª secured against the inner faces of said side bars. The links 75 and 76 are located inwardly of (i. e. between) said guide members.

In the embodiment disclosed, the bricks, resting on their pallets 39, are deposited on an endless conveyer 80 including chains working over front and rear sprocket wheels 81 and 82. When the toggle system above described is operated, the rollers 64 are moved into a plane below the plane of the upper run of the conveyer 80 and the pallets 39 and the bricks superimposed thereon move downwardly with said rollers, the molds being supported the while by the rollers 63. In the course of the downward movement of the rollers 64, the pallets 39 supported thereon ultimately come to rest upon the moving conveyer 80 by which said pallets and the bricks superimposed thereon are carried toward the front end of the machine and from which they are removed by an attendant in charge. Subsequently, the rollers 64 are returned to their normal position wherein they are co-planar with the rollers 63. The guide members 79 which, as above explained, are engaged by rollers 78 carried by the frame 74, have regular forward and downward curvature and are provided to lessen the contact force of the pallets with the conveyer 80 and also to insure an initial movement of the pallets in the direction in which the conveyer 80 travels whereby said pallets shall move with the conveyer instantly that they are deposited thereon. In this way the coöperating rollers 78 and guide members 79 avoid the effects of the inertia which would be developed where the pallets deposited forcibly upon the conveyer 80 in a direction at a right angle to the direction of movement of said conveyer. In other words, the guide members 79 cause the transferring movement of the pallets to be in a direction which gradually approaches and ultimately coincides with the direction of movement of the conveyer 80 whereby the contact force of the pallets with said conveyer is lessened and the pallets are moved by the conveyer toward the front end of the machine immediately that they are deposited thereon. The rollers 64 remain in their lowermost positions until the pallets have been carried by the conveyer 80 to positions wherein they will not interfere with the upward or return movement of the rollers 64. The rollers 64 are lowered and raised during the periods in which the mold carrier remains stationary, as is obvious.

The brick discharging mechanism is preferably operated from the counter shaft 15 through a lever 83 pivotally connected at its inner end to a bracket 84 on the frame of the machine, engaging at an intermediate point thereof a cam 85 mounted on the shaft 15 adjacent the crank wheel 18 and connected at its outer end by a link 86 to an arm 87 mounted on the shaft 88 which forms the pivotal axis for the lower rear toggle links 76 and on which said toggle links are fast. The contour of the cam 85 is selected to cause the rollers 64 to be supported in their uppermost positions during the periods when the mold carrier is in movement and to provide for the lowering of the rollers 64 during the periods when the mold carrier remains stationary and for the retention of the rollers 64 in a plane below the upper run of the discharge conveyer 80 until the pallets deposited on said conveyer have been moved thereby to positions clear of said rollers 64.

The conveyer 80 is conveniently driven directly from the main shaft 22, preferably through a crossed belt 89 working over a pulley on said main shaft and over a pulley on the shaft 90 which carries the front sprockets 81 of the conveyer 80.

*The mechanisms which operate in relation to the empty molds.*—The machine includes a number of other mechanisms which operate in relation to the empty molds to prepare them for re-use. These latter instrumentalities, which will be described *seriatim*, are a mold washer and sprayer, a mold sander and a means whereby the molds are held in close contact with one another while passing under the mud press, such means being conveniently termed a "mold press."

*The mold sprayer.*—The molds, following the operation of the brick discharging mechanism, travel upon the rollers 63 and first pass in relation to the mold sprayer (Figs. 1 and 21) which comprises upwardly directed spraying nozzles 91 located so as to come under the several mold chambers 6 and supported by cross pipes 92, in turn connected to a water supply pipe 93 through which water is forced under pressure during the periods when the mold carrier is stationary. The pipe 93 is provided with a spring held valve 94 of suitable construction and said valve is opened during the period referred to, conveniently and preferably, by a bell crank lever 95 engaging the stem thereof and operated by an adjacent roller 78 of the brick discharging mechanism, the lever 95 being located at the outer side of the guide member 79 in which said roller 78 operates and said roller being sufficiently wide to project slightly beyond said guide member whereby it will, on its descent, engage and operate said lever 95.

*The mold sander.*—From the mold sprayer the molds pass to the mold sander, (Figs. 1, 4, 12, 13 and 14), the office of which is to deposit a coating of sand upon the several walls of the mold chambers. The sand is thrown against the walls of the mold chambers by the mechanism of the mold sander and adheres to the said walls by virtue of the moisture thereon incident to the passage of the molds in relation to the mold sprayer. The mold sander, in the preferred embodiment shown, includes a box 96, arranged below the molds and open at its upper end, and a series of distributing blades 97 working throughout the extent of said box, the latter having a length approximately the same as the length of each mold. As shown, there are four groups of blades 97, each group of blades being mounted on a shaft 98 extending lengthwise of the box 96 and the blades of each group projecting at different angles from said shaft. In the embodiment disclosed two of the groups of blades operate in relation to each mold. The box 96 is partially filled with sand and the blades are rotated at a relatively rapid rate and throw the sand against the walls of the mold chambers, a certain percentage of the sand adhering to said walls by virtue of the moisture thereon, as above explained. The shafts 98 are journaled in bearings secured to the frame of the machine and project beyond the machine frame at one side thereof, their projecting ends being provided with intermeshing pinions 99 whereby the rotation of one shaft will be transmitted to the others. One of the shafts 98 is geared to a suitable driving element, conveniently to the shaft 88 which carries the lower rear toggle links 76 of the mechanism for discharging the bricks, the gearing 100 between the shaft 88 and the specified shaft 98 being preferably of chain and sprocket wheel type, and including a sprocket wheel 101 loosely mounted on the shaft 88 and provided at one side thereof (Fig. 15) with a ratchet wheel 102 and an arm 103 fast on the shaft 88 and provided with a pawl 104 for engagement with the ratchet wheel 102.

The blades are rotated while the mold carrier remains stationary, and for this purpose the pawl 104 engages the ratchet wheel 102 and operates the gearing 100 during the movement of the shaft 88 to lower the frame 64 of the brick discharging mechanism. On the movement of the shaft 88 to return the frame 64 to its normal elevated position, the pawl 104 rides over the ratchet wheel 102 and is, therefore, without effect on the gearing 100.

Sand is fed into the box 96 from a sand bin 105 having a spout 106 which discharges into said box. The latter has at the end opposite the spout 106 a depending sand discharge spout 107 which carries the excess sand from the box 96 to a rotary sand screen 108. The screen 108 has an outside casing 109 which traps the screened sand and delivers it to the lower end of an endless elevator 110 working in a casing 111. The unscreened sand passes through the elevator boot to the floor or into a suitable receptacle provided therefor. The elevator 110 returns the sand to the bin 105. The upper shaft 112 of the elevator 110 is geared to a suitable driving element of the machine, conveniently the rear shaft 113 of the conveyer 80, by a crossed belt 114 working over pulleys on the shafts 112 and 113.

By the use of the sand screen 108 and the elevator 110, advantages are secured in that there is no waste of sand, all the sand capable of re-use being returned to the bin, while at the same time, the sand which is unfit for further use by virtue of its being too coarse or of having particles of clay adhering thereto, is rejected. In this way, a supply of sand originally charged in the bin 105 will give useful service for a maximum length of time and will always be of good quality or condition in consideration of the purposes for which it is intended.

During their passage through the mold sander the molds are supported on a plate 96ª arranged over the box 96 and which is cut away throughout an area equal to the aggregate areas of the molds located over said box whereby the box is open at its upper end, as above described, and the sand may be thrown from the box into the molds.

The molds, during their travel between the mold sander and the mold press, move through the arc prescribed by the rear sprocket wheels 4. During the idle periods of the mold carrier, certain of the molds will remain stationary in positions adjacent the periphery of the sprocket wheels 104 and while stationary in such positions they may be readily manipulated by the attendant for the purpose of disengaging their lugs 7 from the chain 2 and of effecting their removal from the carrier if desired. For the purpose of supporting the molds at the inception of their movement through the arc prescribed by the sprocket wheels 4, the frame bars 11 are provided with suitable curved mold supporting brackets 115 of the necessary extent.

*The mechanism for holding the molds in contact with one another during their passage in relation to the mud press.*—The construction and operation of this mechanism will best be understood if, as a preliminary, attention be given to the construction of the molds and to certain features thereof which concern their coöperation with the mechanism in question. The molds are illustrated in detail in Figs. 17 to 20 and are provided at their ends with projections 116 which incidentally serve as handles and at their sides, adjacent their upper edges, with contact bars 117 and below said bars and adjacent the ends thereof with bumper lugs 118. When the molds are acted on by the mold press, the bars 117 contact with one another throughout their extent and thus prevent any substantial leakage of clay through the spaces between the molds. Said bars, however, are of less depth than the molds whereby spaces 119 intervene between the molds below said bars through which any clay that might possibly be forced between the bars 117 will drop. The provision of the bars 117 insures that the amount of clay which passes between the molds shall be very slight and the provision of the spaces 119 below said bars insures that any clay which may be forced between the molds will not accumulate but will drop through the open lower ends of said spaces.

The mechanism for holding the molds in contact with one another during their passage in relation to the mud press (Figs. 1, 2, 4 and 17) and which, as above stated, may be conveniently termed the "mold press," in the embodiment shown, includes a reciprocatory, transversely disposed yoke 120 of substantially inverted U-shape, the cross bar of which projects over the molds and the side bars 121 of which engage the ends of the projections or abutments 116 provided at the ends of the molds. The yoke 120 is carried by wheels 122 which in one direction of movement of said yoke travel on lower tracks 123, and in the opposite direction of movement of said yoke travel on upper tracks 124, the tracks 123 and 124 extending lengthwise of the machine. The tracks 124 are provided with forwardly and downwardly inclined front portions 125 and are pivoted at points intermediate their length, as at 126, to the frame of the machine for movement in vertical planes. When the yoke 120 is moved toward the forward end of the machine, its wheels 122 move along the tracks 123 and its side bars 121 engage the projections or abutments 116 of the mold immediately in advance thereof and act as followers upon all the molds along the upper run of the mold carrier, whereby each mold is brought into contact with the mold immediately in advance thereof and the intervening spaces (due, for example, to wear or to loose play among the links of the chain 2) are taken up. When the mold carrier has completed a step of its movement, the yoke 120 is moved toward the rear end of the machine and back into its starting position. During the rearward movement of the yoke 129 its wheels 122 move along the upper tracks 124, first traveling upwardly along the inclined front portions 125 of the tracks 124 and thereafter moving along the straight portions of said tracks. As the wheels 122 pass rearwardly beyond the pivots 126 the weight of the yoke causes the tracks 124 to tilt, whereby the rear portions of the tracks 124 are directed downwardly toward the tracks 123 and the wheels 122 thus move from the tracks 124 back upon the tracks 123, into their starting positions wherein the side bars 121 of the yoke 120 will aline with the projections or abutments 116 of the mold immediately in advance thereof. For the purpose of operating the yoke 120 in the manner described, it is preferred to employ links 127 which connect the sides of said yoke with arms 128 on the shaft 8 of the front sprocket wheels 3 and are located in planes beyond the planes of the chains 1 and 2 and the mold ends and inwardly of the planes of the wheels 122.

The yoke 120 acts on the molds to take up any spaces that may happen to intervene between them by reason of the fact that its forward movement is initiated slightly before the forward movement of the chains 1 and 2. This will be apparent when it is considered that the yoke 120 moves forwardly immediately that the rotation of the shaft 8 is initiated but the chains 1 and 2 are not moved until the pawls 14 engage the teeth of the ratchet wheels 12. Inasmuch as there will be a slight rotation of the shaft 8 before the pawls 14 engage the teeth of the ratchets 12 it follows that the movement of the yoke 120 will be initiated slightly before the movement of the chains 1 and 2 and that said yoke during its initial movement and while said chains are remaining stationary, acts on the molds in advance thereof to force them into contact with one another and, during its subsequent movement and while said chains are moving, maintains the molds in advance thereof in contact with one another.

The links 127 are preferably provided with turnbuckles 127ª whereby they may be lengthened or shortened as the exigencies of use may require. Obviously, by making said links shorter, the action of the yoke 120 on the mold takes place earlier in the forward movement of said yoke and by making said links longer the action of the yoke 120 on the molds takes place later in the forward movement of the yoke.

*The mechanism for operating the mud press and the mechanism for controlling the operation of the mud press.*—The machine disclosed includes among its features a novel mechanism for operating the rock shafts 26 of the mud press and a novel mechanism for controlling the operation of the mud press (Figs. 1 and 3). This mechanism forms the subject of a divisional application Serial No. 68,403 and will, therefore, be described only in sufficient detail to distinguish its elements from the elements of other mechanisms of the machine.

The rock shafts 26 are operated by a reciprocatory bar 129 through a toggle system comprising links 130 and 131. The bar 129 derives its motion from a sliding head 132 operated through a connecting link 133 from a crank arm 134 provided on the counter shaft 15. The head 132 is of box-like construction and partially incloses the bar 129. Said head is provided along its rear edges with guide flanges 135 engaging in vertical guideways 136 at the sides of a plate 137 secured to the frame of the machine. The head 132 is also provided with other flanges which engage in grooves 139 formed in the sides of the bar 129. The head 132 includes as a part thereof an inclosed clamping shoe (not shown) which is operative to frictionally engage the bar 129 and to thereby cause said bar to participate in the movement of said head. The operation of the clamping shoe referred to is controlled by a horizontal rock shaft 141 journaled in the lower portion of the head 32 and having at one end thereof a weight 144 and at its other end an arm 150 coacting with an adjustable rail 145 mounted on the plate 137.

*The end wall construction of the mud press casing.*—The end walls of the mud press casing, i. e. the walls which extend transversely of the machine, are preferably of the construction shown in Figs. 22 and 23 and include fixed outer members 153 and vertically slidable inner members 154, which latter, fitting against the inner sides of the members 153, are provided with projections 155 working through slots 156 in the members 153 and acted upon by expansive springs 157 bearing at their upper ends against lugs 158 provided on the members 153. The projections 155 are connected by a suitable bar 159 which rests upon an eccentric 160 pivoted on the member 153 and provided with a suitable operating handle. In use, this eccentric may be turned to limit the downward movement of the bar 159 and therewith of the movable inner wall sections 154.

The inner wall sections 154 are of triangular outline in cross section and are provided to prevent undue leakage between the top of the mold and the machine front, serving this function by striking the clay off even with the top of the mold as the latter passes from the machine and by engaging upon the top of the mold, notwithstanding any wear or unevenness thereof. In this way, the clay is prevented from accumulating under the front portion of the die, it being observed that should clay accumulate under the front portion of the die, it is apt to pick up clay at the front portion of the mold chamber and to cause the resultant bricks to be round at their corners instead of square. It is to be noted that by the arrangement of the yieldable wall sections 154 at the inner sides of the fixed walls the clay cannot fill up or accumulate within the clearance between the two wall sections and, hence, cannot interfere with the yielding action of the movable wall members incident to the performance of the above-described function for which they are intended. The only effect of the pressure of clay against the movable wall members is to produce a good contact between said movable members and their companion fixed members which facilitates the action of the movable members and prevents leakage of clay to the outside of the machine.

It will be understood that no specific description herein contained is intended to put any limitation upon the scope of the appended claims which does not inhere in the language thereof.

Having thus described my invention, I claim:

1. In a brick machine, in combination, an endless carrier for molds in which bricks are formed, means located adjacent an end of the carrier for feeding pallets to the molds, endless belts located under the pallet-feeding means for holding the pallets against and in operative relation to the molds as the latter pass from the upper to the lower run of the carrier and spring pressed pulleys over which the belts are trained and by which the belts are caused to exert pressure on the pallets.

2. In a brick machine, in combination, a mold carrier, a mold washing means, and means operating on the molds immediately after their passage beyond the mold washing means for applying sand thereto.

3. In a brick machine, in combination, an endless mold carrier, a mold washing means arranged below the lower side thereof and means also arranged below the lower side thereof and operating on the molds immediately after their passage beyond the mold washing means for applying sand thereto.

4. In a brick machine, in combination, an endless mold carrier, a mud press for forming bricks in the molds on said carrier, and means operating on the molds with pushing effect for holding them in contact with one another during their movement in relation to the mud press.

5. In a brick machine, in combination, an endless mold carrier comprising parallel chains and sprockets over which said chains travel, molds having lugs engaging between certain links of said chains to connect said molds to said chains for movement therewith, a mud press, and means for holding the molds in contact with one another during their movement in relation to the mud press.

6. In a brick machine, in combination, a carrier for molds in which bricks are formed and means for feeding pallets to the molds on said carrier comprising a pallet magazine open at its lower end, ledges at the lower end of said magazine upon which the lowermost pallet rests, the magazine having slots above said ledges, lugs projecting into and working through said slots, a reciprocatory frame carrying said lugs, and means for reciprocating said frame.

7. In a brick machine, in combination, a carrier for molds in which bricks are formed, means for feeding pallets to the molds on said carrier comprising a pallet magazine open at its lower end and reciprocatory devices for discharging the pallets one at a time from said magazine upon the mold successively moved adjacent thereto by said carrier, means for producing a step-by-step operation of said carrier, and operative connections between an element of said carrier operating means and said reciprocatory devices whereby to operate the latter during the periods of movement of the carrier.

8. In a brick machine, in combination, an endless carrier for molds in which bricks are formed, means for feeding pallets to said molds, endless belts for holding the pallets against the molds during their movement from the upper to the lower run of said carrier, end and intermediate pulleys over which the belts are trained, and spring-held carriers for the end pulleys.

9. In a brick machine, in combination, an endless carrier for molds in which bricks are formed, means for feeding pallets to said molds, endless belts for holding the pallets against the molds during their movement from the upper to the lower run of said carrier, end and intermediate pulleys over which the belts are trained, radius links carrying the end pulleys and retractile coil springs connecting the angularly disposed radius links.

10. In a brick machine, in combination, means for supporting a plurality of inverted molds, means for moving said molds through a prescribed path, and mechanism located below said molds for discharging bricks therefrom, said mechanism comprising a vertically movable frame, front and rear toggle links arranged at opposite sides of the machine for supporting and operating said frame, means for breaking and extending said toggle links, a brick conveyer upon which the bricks are deposited by the frame when the latter is lowered consequent to the breaking of the toggle links, downwardly extending slotted guide members curved in the direction of forward movement of said conveyer and rollers carried by the frame and engaging in said guide members whereby to lessen the force with which the bricks are deposited upon the conveyer and to deposit the bricks upon the conveyer in a direction coinciding with the direction of forward movement of the conveyer.

11. In a brick machine, in combination, an endless carrier, a plurality of molds arranged thereon, a mud press for forming bricks in said molds, the molds having end abutments, a reciprocatory yoke formed to engage said abutments whereby to establish contact between the molds during their movement in relation to the mud press, means for reciprocating the yoke, and means for elevating the yoke above the molds during its return movement.

12. In a brick machine, in combination, an endless carrier, a plurality of molds arranged thereon, a mud press for forming bricks in said molds, the molds having end abutments, a reciprocatory yoke formed to engage said abutments, whereby to establish contact between the molds during their movement in relation to the mud press, means for reciprocating the yoke, the yoke having wheels at the end thereof, straight tracks upon which said wheels run during the forward movement of the yoke, and pivotally mounted tracks arranged above said straight tracks and having forwardly and downwardly inclined front end portions along which said wheels travel during the return movement of the yoke whereby to elevate the yoke during its return movement above the molds, the pivotally mounted tracks yielding to direct the yoke upon the straight tracks when the wheels of the yoke have passed rearwardly beyond the pivotal axes of said pivotally mounted tracks.

13. In a brick machine, in combination, a carrier for molds in which bricks are formed and including an endless chain, and sprocket wheels over which said chain is trained, other wheels having cam projections, one of said last named wheels being formed with sprocket teeth to engage said chain, levers arranged at the sides of said carrier and provided with hammers to strike the molds and jar the bricks loose from the walls thereof, springs operating said levers, and means operated by said cam projections for moving said levers against the tension of their springs.

14. In a brick machine, in combination, a carrier for molds in which bricks are formed and including an endless chain, and sprocket wheels over which said chain is trained, other wheels having cam projections, one of said last named wheels being formed with sprocket teeth to engage said chain, levers arranged at the sides of said carrier and provided with hammers to strike the molds and jar the bricks loose from the walls thereof, rock shafts carrying said levers, torsion springs operating on said rock shafts, and arms projecting from said rock shafts for engagement with said cam projections.

15. In a brick machine, in combination, a mold carrier comprising two pairs of parallel endless chains, the chains of each pair being connected to move as one, molds having lugs at the ends thereof to engage between certain links of one chain of each pair, and sprocket wheels arranged in front and rear pairs and engaging those chains of each pair which are not engaged by said lugs.

16. In a brick machine, in combination, an endless mold carrier including parallel chains, sprockets over which said chains move, molds having lugs engaging between certain links of said chains to connect the molds to the chains and permitting the removal of the molds from the chains during the period in which the molds move through the arc prescribed by the sprocket at the rear end of the carrier, and means for supporting the molds along the lower run of the carrier and at the forward end of the carrier.

17. In a brick machine, in combination, a plurality of molds in horizontal alinement, a mud press for forming bricks in the molds, means for moving the molds in a horizontal path in relation to the mud press, and means independent of said mold moving means and acting in conjunction therewith for holding the molds in contact with one another during their movement in relation to the mud press.

18. In a brick machine, a plurality of structurally independent conterminously arranged molds having contact bars throughout the upper portions of their adjoining sides and having bumper lugs below said bars and at the ends of their adjoining sides and carrier chains supporting the molds and from which the molds are separable.

19. In a brick machine, in combination, a mud press having a discharge opening formed by side walls and end walls, the end walls being composed of fixed members and vertically movable members, the latter being located adjacent the inner sides of the fixed members, the fixed members having vertical slots, the movable members having lugs projecting through said slots, springs acting on said lugs to force said movable members downwardly, and a mold carrier movable through the mud press under said opening, the inner movable wall members being formed to level the clay forced by the mud press into the molds on said mold carrier.

20. In a brick machine, in combination, a mud press having a discharge opening formed by side walls and end walls, the end walls being composed of fixed members and vertically movable members, the latter being located adjacent the inner sides of the fixed members, springs acting on the movable members to force them downwardly, and a mold carrier movable through the mud press under said opening, the inner movable wall members being formed to level the clay forced by the mud press into the molds on said mold carrier.

In testimony whereof I have hereunto set my hand in presence of two subscribing witnesses.

CHARLES H. HORTON.

Witnesses:
 JOHN L. POWERS,
 CHAS. S. HYER.